UNITED STATES PATENT OFFICE.

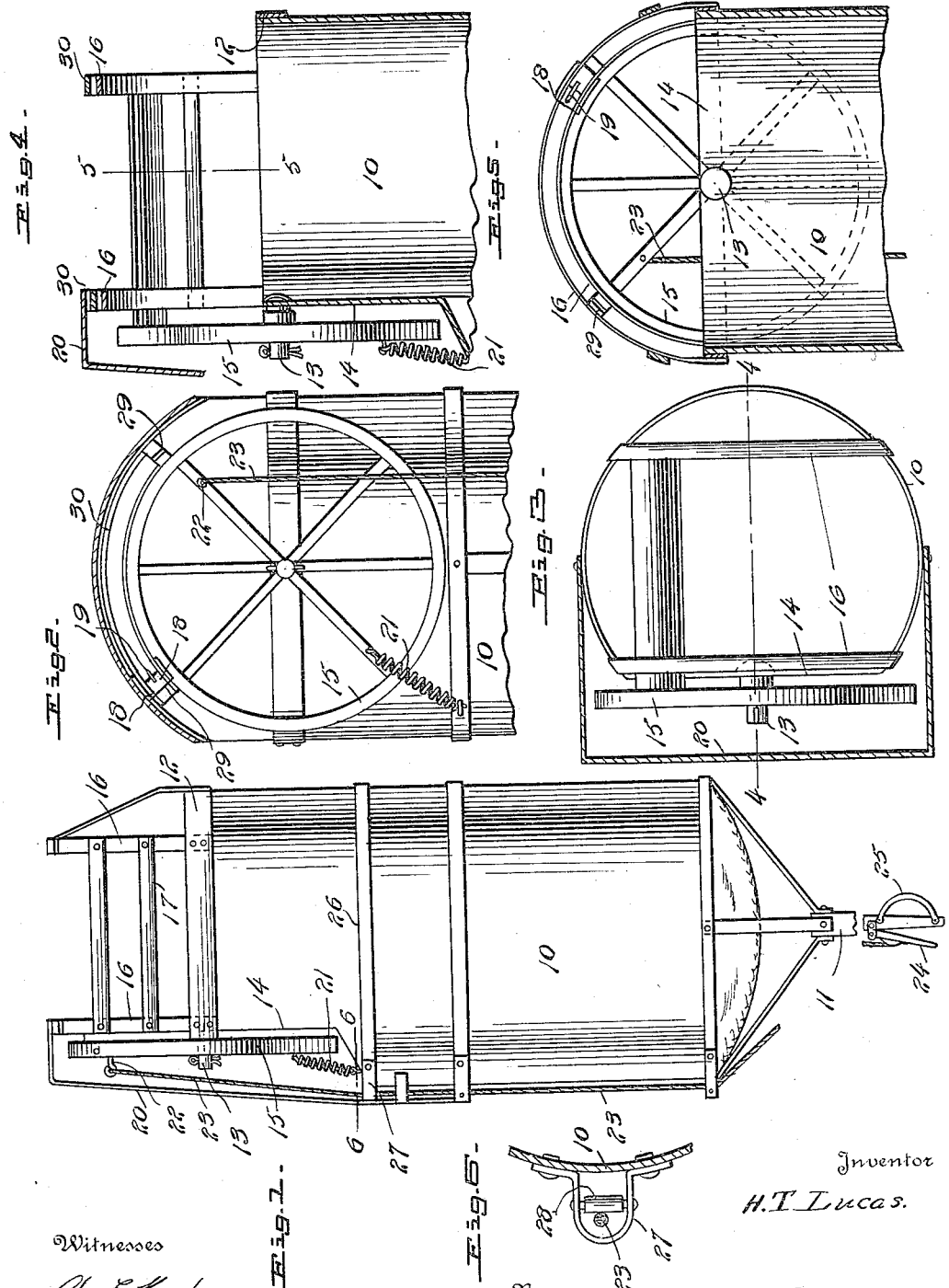

HERMAN T. LUCAS, OF GRAND RAPIDS, MICHIGAN.

FRUIT-PICKER.

1,166,066.  Specification of Letters Patent.  Patented Dec. 28, 1915.

Application filed February 10, 1914. Serial No. 817,842.

*To all whom it may concern:*

Be it known that I, HERMAN T. LUCAS, a citizen of the United States, residing at Grand Rapids, in the county of Kent, State of Michigan, have invented certain new and useful Improvements in Fruit-Pickers; and I do hereby declare the following to be a full, clear, and exact description of the invention, such as will enable others skilled in the art to which it appertains to make and use the same.

This invention relates to improvements in fruit pickers.

One object of the invention is to provide a novel clipping device for severing the stems of the fruit to cause the fruit to drop into a suitable receptacle.

Another object is to provide novel means for operating the clipper and for returning the same to normal position.

Other objects and advantages will be apparent from the following description when taken in connection with the accompanying drawing.

In the drawings: Figure 1 is an elevation of my improved fruit picking device, the supporting pole being broken away in the middle. Fig. 2 is an elevation of the upper portion of the device taken at right angles to that shown in Fig. 1, partly broken away. Fig. 3 is a top plan view. Fig. 4 is a vertical transverse section on the line 4—4 of Fig. 3. Fig. 5 is a section on the line 5—5 of Fig. 4. Fig. 6 is a section on the line 6—6 of Fig. 1.

Referring particularly to the drawings, 10 represents a suitable receptacle which may be formed of any suitable material, but preferably galvanized sheet tin. Suitably secured to one side of this receptacle is the upper end of a supporting pole 11, by means of which the receptacle is moved about from point to point in a fruit tree as will be readily understood. Carried by the upper rim of the receptacle 10 is a metallic band 12, and secured to one side of this band is an outwardly projecting stub shaft 13. The portion of the receptacle from which the stub shaft projects, and to a suitable distance therebelow is flattened, as indicated at 14 to permit the wheel 15 which is rotatably mounted on the shaft 13 to turn freely. Secured to opposite sides of the band 12 and arching upwardly above the receptacle are the parallel metal straps 16. Extending between these pairs of bands, and secured at their ends to the bands are suitable bracing strips 17. Secured to the wheel 15 and extending transversely over the top of the receptacle between the straps 16 are the plates 18, between which plates is clamped a cutting blade 19. Secured to the receptacle and to one of the straps 16 is a detachable cover 20 arranged over the wheel 15 to protect the same during the operation of the device. Secured at one of its ends to the receptacle at a point below the wheel, and at its other end to the lower portion of the wheel is a spring 21 which holds the wheel normally in such position that the knife is at one end of the guiding straps 16. Projecting from the upper portion of the wheel is a pin 22, to which is connected a cord or wire 23 extending to a point adjacent the lower end of the pole 11 where it is connected to a pivoted hand lever 24 mounted on the pole. At the opposite side of the lower end of the pole is a loop 25 through which the hand of the operator is thrust to grip the pole. Extending outwardly from a band 26 disposed around the receptacle 10, and at the side below the wheel 15 is a loop 27, within which is suitably journaled a spool or roller 28 for guiding the cord or wire 23. If desired the band 26 may be dispensed with, and the mounting for the spool secured directly to the receptacle.

Secured to each of the straps 16 on each side of the longitudinal center thereof is a block 29, and secured at its opposite ends to these blocks in parallel arched relation to the strap is a shorter strap 30. This shorter strap 30 coöperating with the upper portion of the strap 16 to form a guide in which the plates 18 carrying the cutting blade freely slide. There are two of the upper strips 17 arranged in parallel relation in such position that the knife blade will pass therebetween to sever the stems of the fruit.

In the operation of the device the receptacle is elevated into the tree so that a piece of fruit will depend between the straps 16. The lever 24 is then drawn against the lower end of the pole 11 so that the wire 23 will rock the wheel 15 and carry the knife through the guides 30 and sever the stem of the fruit against the upper edges of the upper strips 17. The severed fruit then falls into the receptacle. Upon release of the handle lever 24, the spring 21 will rock the wheel back into normal position so that the knife blade will be returned to the other end of the guides.

What is claimed, is:—

In a fruit picking device, a suitably supported receptacle, upwardly extending pairs of parallel arcuate guides mounted on the receptacle, a wheel mounted on one side of the receptacle, parallel stationary cutting blades carried by the guides at one end thereof, a laterally extending block carried by the ring of the wheel and movable between the pairs of arcuate guides, a knife carried by the block and projecting from the forward edge thereof, said knife being adapted to pass between the said stationary cutting blades and coöperate therewith to sever a fruit stem, said block engaging the stationary blades to limit the movement of the knife between the blades, means for yieldably holding and returning the wheel and knife to normal position, and means for imparting a partial rotation to the wheel to move the knife through the guides and into coöperative relation with the stationary cutting blades.

In testimony whereof, I affix my signature, in the presence of two witnesses.

HERMAN T. LUCAS.

Witnesses:
JAMES B. HAMMOND,
HERBERT E. STILES.

Copies of this patent may be obtained for five cents each, by addressing the "Commissioner of Patents, Washington, D. C."